Figure 1:
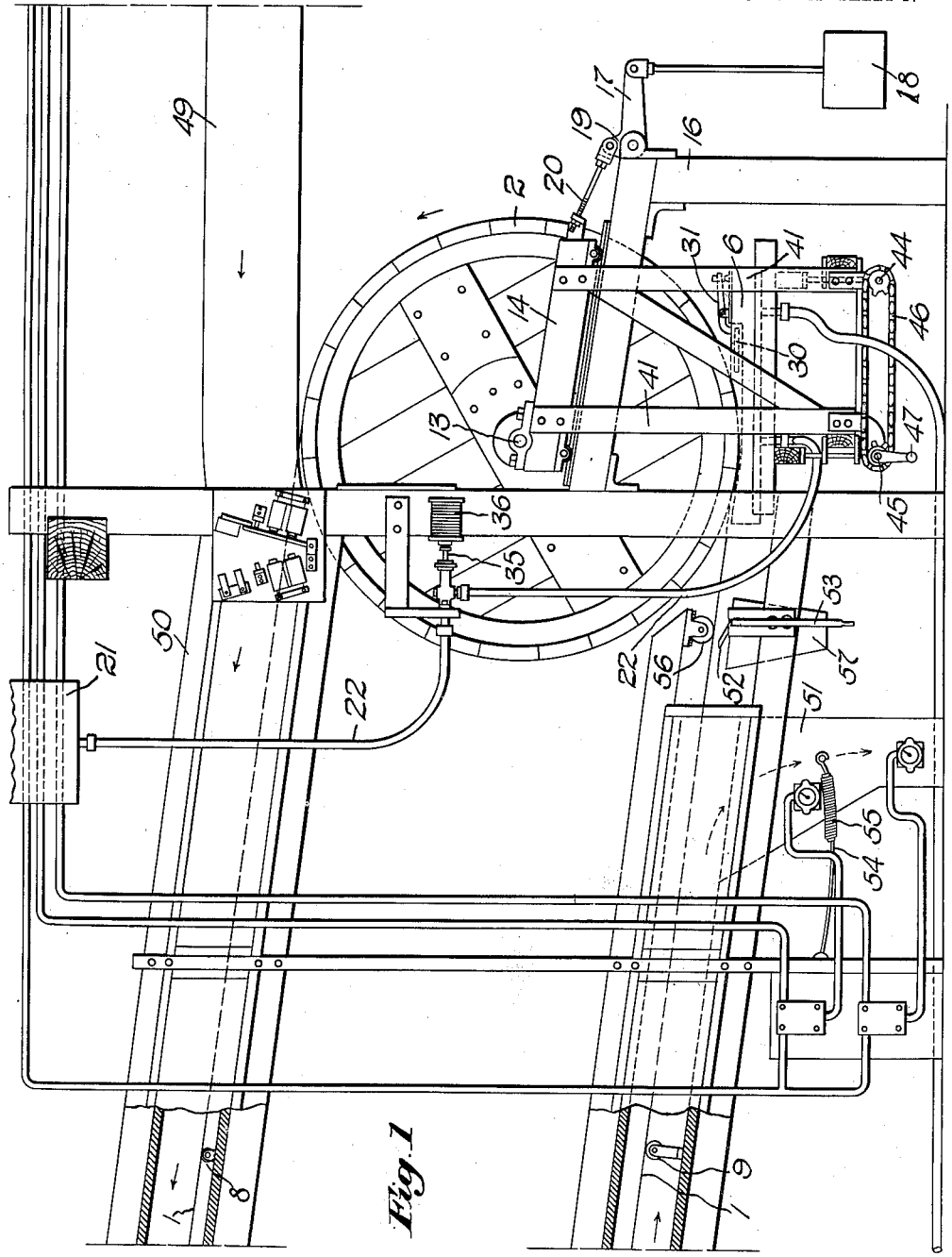

No. 866,586. PATENTED SEPT. 17, 1907.
J. M. HUSSEY.
METHOD OF DESICCATING EGGS.
APPLICATION FILED JUNE 13, 1907.

5 SHEETS—SHEET 2.

Witnesses:
Horace A. Croisman
Robert H. Kammler

Inventor:
John M. Hussey
by Emery and Booth
Attys.

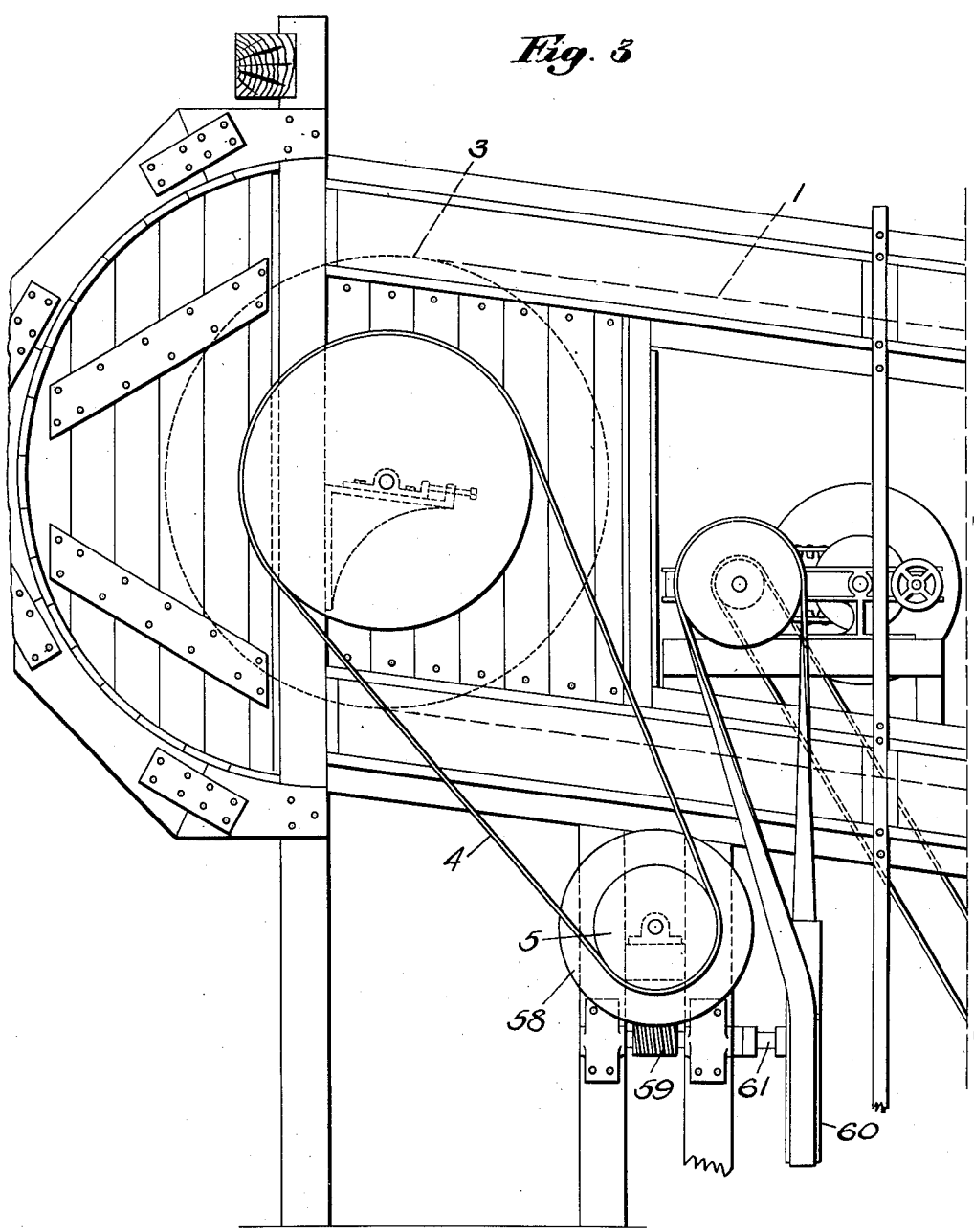

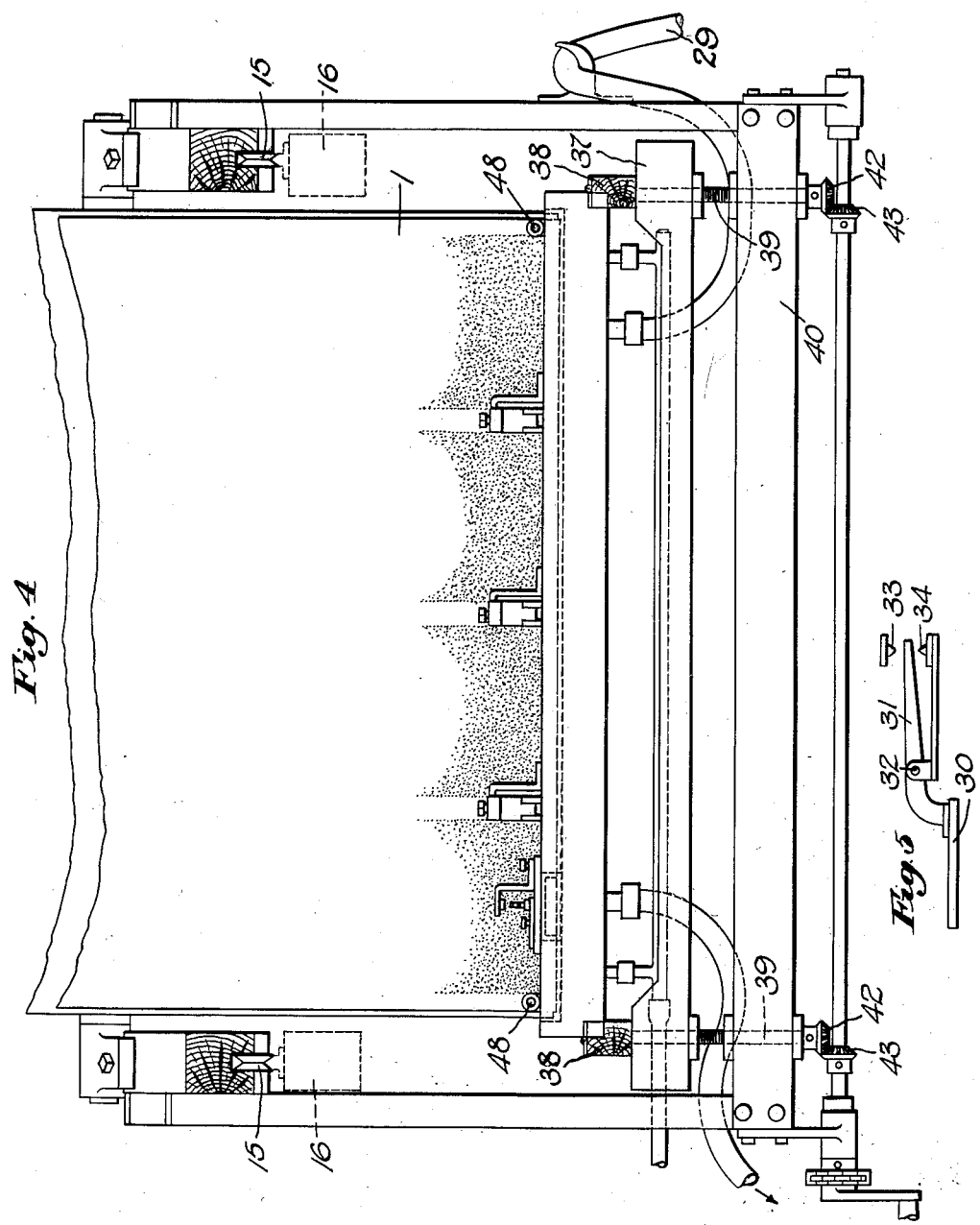

No. 866,586. PATENTED SEPT. 17, 1907.
J. M. HUSSEY.
METHOD OF DESICCATING EGGS.
APPLICATION FILED JUNE 13, 1907.
5 SHEETS—SHEET 5.
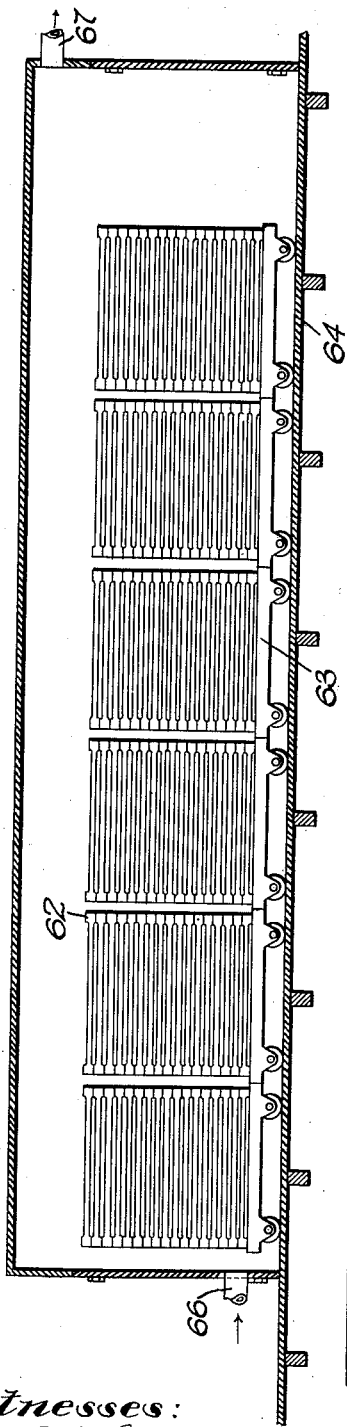
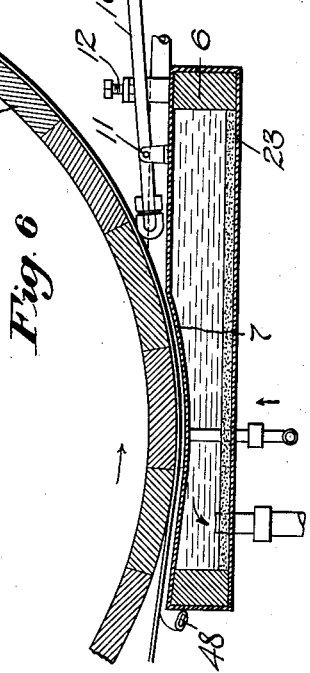
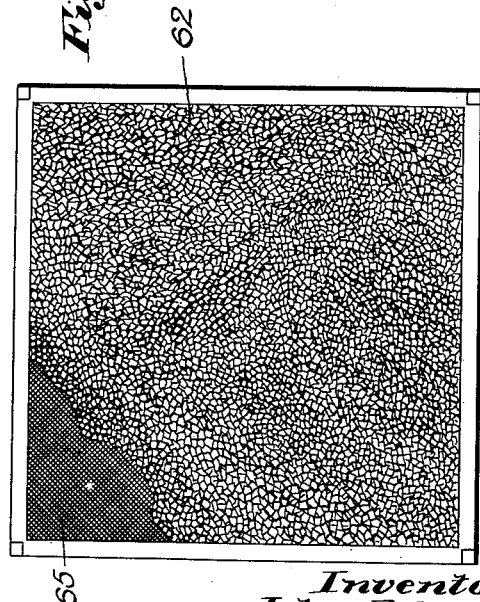
Witnesses:
Horace H. Crossman
Robert H. Kammler
Inventor:
John M. Hussey
by Emery and Booth Attys

UNITED STATES PATENT OFFICE.

JOHN M. HUSSEY, OF CAMBRIDGE, MASSACHUSETTS.

METHOD OF DESICCATING EGGS.

No. 866,586.  Specification of Letters Patent.  Patented Sept. 17, 1907.

Original application filed March 8, 1907, Serial No. 361,225. Divided and this application filed June 13, 1907. Serial No. 378,830.

*To all whom it may concern:*

Be it known that I, JOHN M. HUSSEY, a citizen of the United States, residing at Cambridge, in the county of Middlesex and State of Massachusetts, have invented an Improvement in New and Useful Methods of Desiccating Eggs, of which the following description, in connection with the accompanying drawings, is a specification, like letters on the drawings representing like parts.
This invention relates to a new and useful method of desiccating eggs, this application being a division of my application No. 361,225, filed March 8, 1907.

In order that the invention may be clearly understood, I herein disclose one form of mechanism whereby my method may be carried out, it being understood that the method may be carried out by mechanisms widely different from that herein disclosed.

An egg containing moisture deteriorates very rapidly in the presence of air and heat. The fatty and oily substances in an egg become rapidly rancid and insoluble at about 55° F., and the albumen therein coagulates at about 130° F. Hence, the egg film while being dried should be maintained, to prevent ultimate insolubility, at a temperature preferably not exceeding 55° F., or if such temperature be exceeded, it should be for such a brief period as to prevent ultimate insolubility of the product. Both moisture and heat favor the promotion of bacterial and chemical activity, both of which are objectionable. The objectionable chemical action is that of the oxygen on the fats or oils and albumen. Among the fats and oils of the egg are olein and margarin. The olein in the egg between 54° and 72° F. aids in dissolving or liquefying the other oils, fats and fatty acids. In processes heretofore practiced, the olein was heated to a temperature so high as to become an acid, and hence did not in the dried product act as a solvent in dissolving the other oils, fats and fatty acids.

When a portion of the egg becomes dissolved, deterioration thereof—rancidity—at once sets in. If all the portions were uniformly and rapidly soluble, the dissolved product might be used before deterioration results, but in prior products those portions first dissolved become rancid before other portions become dissolved.
Such deterioration is largely bacterial, the presence of moisture aiding the rapid development or increase of many forms of bacteria, the most destructive, perhaps, being *bacilli oogenes fluorescens* and *oogenes hydrosulphurens*, the latter developing sulfureted hydrogen.
While the product is in a dried state, the bacteria therein are inactive or mummified, as it were, and apparently become reduced in numbers, but while it is partially or wholly liquefied, the bacteria multiply rapidly.
In the carrying out of my process I form from a mass of liquid egg as thin a film as possible upon a suitable drying surface. I rapidly withdraw all or nearly all of the moisture from this film without, however, heating the film to a temperature to render portions thereof in the ultimate product insoluble, that is to say—I prevent the temperature of the film from rising above about 55° F., though for a comparatively short portion of the drying action this temperature may be exceeded. This drying is rapidly performed to prevent oxidation and resulting rancidity. This film is uniformly and evenly distributed upon the drying surface. Upon this film, when so dried, I superimpose a second film, which is dried in the same manner and which is also of uniform thickness. Inasmuch as the first film is dried and non-viscid when the second is received thereon, the second film may be of exceeding thinness, which cannot be the case if the second layer is applied to a viscid first layer. I superimpose, in the same manner, any desired number of layers—preferably from ten to fifteen in all.

In order that the principles of the invention may be fully understood, I have herein illustrated one type or embodiment of apparatus whereby the described process may be carried out.

Figure 2:
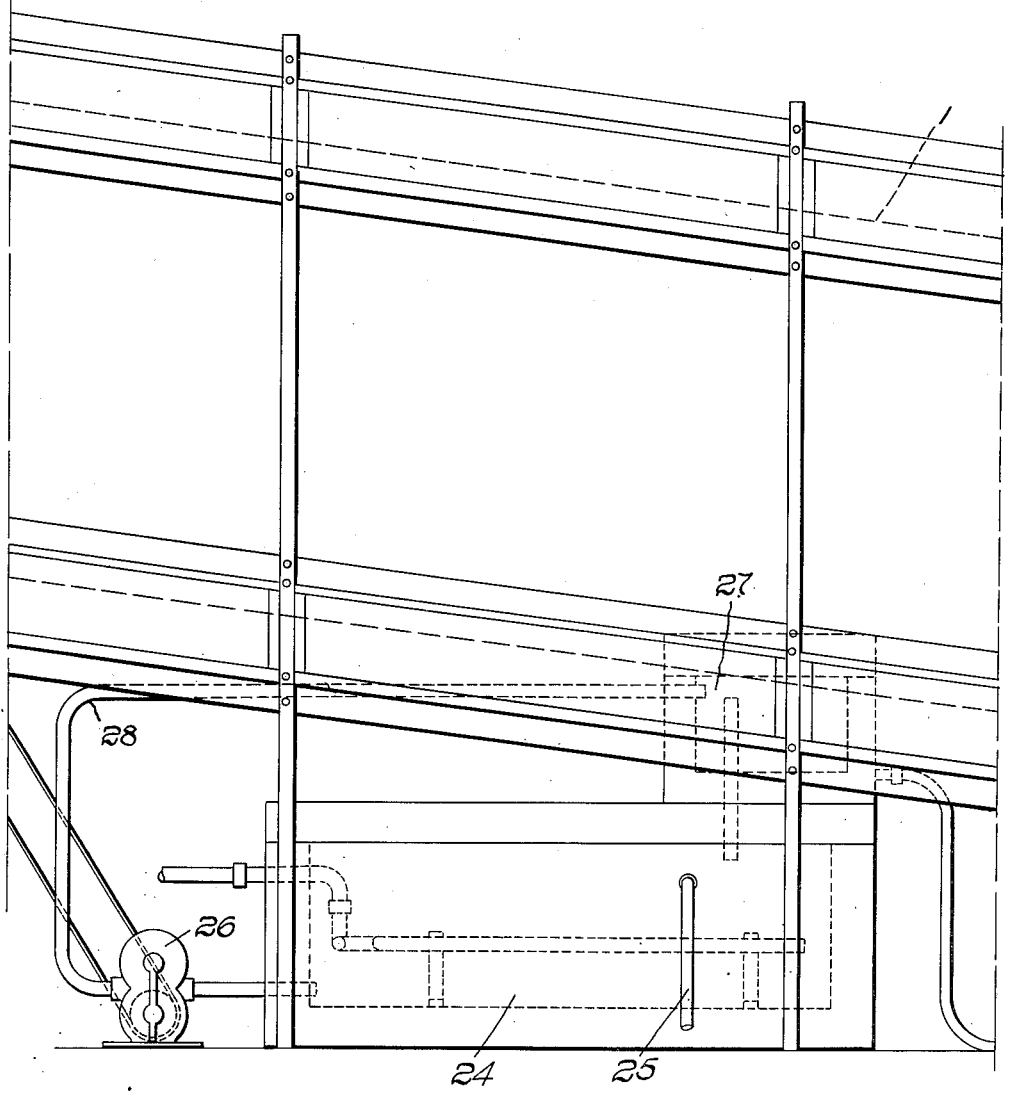

In the drawings, illustrating such mechanism, Figure 1 is a side elevation of one of the drums whereon an egg receiving belt is mounted, together with a portion of such belt and mechanism for applying egg to the belt; Fig. 2 is a side elevation of the intermediate portion of the belt and portions of the mechanism adjacent thereto; Fig. 3 is a side elevation of the drum for supporting the belt at the end thereof opposite that shown in Fig. 1 and drum operating mechanism; Fig. 4 is an end elevation of a portion of the belt adjacent the point where it receives a film thereon and the parts associated therewith; Fig. 5 is a side elevation of a form of float preferably used in connection with the egg receptacle; Fig. 6 is a vertical sectional view of the egg receptacle, the belt and the supporting drum above the same; Fig. 7 is a side elevation of a form of final egg drying apparatus that may be employed in carrying out my process; and Fig. 8 is a plan of one of the drying racks used in connection with such apparatus.

The egg contents or batter may be prepared in any suitable or usual manner, as by stirring the whites or yolks, or mixed whites and yolks, until the same is in a condition of uniform liquidity, so as to be capable of application in the form of a thin film.

In that specific embodiment of apparatus preferably employed by me to carry out my process, I use a traveling belt whereto the egg is applied. Since, in carrying out my process I dry each egg film before a second film is applied thereto, I have found a traveling belt to be best adapted for my purpose, as it gives an extended surface, any portion whereof is not returned for a subsequent receipt of egg until the film already deposited thereon has had full opportunity to become dried.

The belt herein shown is disposed with its run substantially horizontal, that is to say, it is horizontal, or the inclination sufficiently approaches the horizontal so that the egg film received thereon will not run and become uneven. Preferably the egg is applied at or near one extremity of the under run of the belt, the belt being inclined to more readily apply the egg thereto.

Referring more particularly to Figs. 1 to 4 inclusive and 6, the belt whereto the egg film is applied is indicated at 1, it being suitably guided about supporting drums 2 and 3 (see Figs. 1, 3 and 6). One of said drums, and herein the drum 3, is positively driven in any suitable manner as by a band 4 passing about a pulley 5 (Fig. 3), to which power is applied in any desired manner. It is apparent that if desired the belt may be arranged with its runs truly horizontal. Preferably the belt is upwardly inclined in the direction of travel from the egg receiving tray, which is indicated at 6 (Figs. 1 and 6), said tray being of any suitable form and structure adapted to receive a sufficient supply of egg. Herein the upper surface of the tray is shown as concaved or recessed as at 7, thus conforming substantially to the surface of the drum 2, which preferably is located at a very slight distance above the surface 7 of the tray. By the described upward trend of the belt, I am enabled to apply the egg to the under run thereof while at the same time confining the egg to such recessed portion of the tray.

As clearly indicated in Fig. 7, the egg is applied directly to the surface of the belt 1. It will be observed that the egg is applied to a continuous or uninterrupted surface from which it may be readily removed at the proper time, as will be more fully described.

Viewing Figs. 4 and 6, it will be observed that the egg is applied in a film to the belt by reason of the travel of such belt in contact with the egg, a preferably shallow supply of which is maintained in or upon the egg tray 6. The egg supply should receive a minimum extent of exposure to the air in order to prevent souring or rancidity thereof. Hence the egg tray is preferably made shallow to maintain the least possible amount of egg therein. The exposed surface of egg should likewise be reduced to a minimum. Moreover it is highly desirable that the length of time of exposure of the film upon the belt to the egg supply, thereby to receive a second film thereon, should be reduced to a minimum, because the exposure of a dried film to the egg supply tends to soften such film. I have found in practice that this injures the product. Hence I reduce to a minimum the arc of exposure of the drum 2, or rather of the belt 1 supported thereon, to the egg. In the present embodiment of the invention, the arc of exposure is represented by the concaved portion of the upper surface of the egg tray 6, represented most clearly in Fig. 6.

The egg supply, when exposed to the air, should for the best results be maintained as near the freezing point as possible. By the described construction, a minimum amount of egg will be taken up by the belt and the egg will be confined strictly to the surface of the belt, means being provided to prevent contact of the egg with either the edge of the belt or any portion of the drums. The belt 1 travels herein in the direction of the arrows in Fig. 1. That portion of the belt which is passing about the lower portion of the drum 2 may be considered as the egg receiving portion of the belt. The speed of the belt should be such that no draining is permitted of the material as the belt rises about the drum 2. When properly operated, the belt receives only a film of the proper thickness. The belt should be sufficiently extensive or the movement thereof should be properly regulated to permit drying of the egg thereon before the return of any portion of the belt to the drum 2. The egg should be applied to the belt as a film of the least possible thickness. In practice, when merely the first film is applied thereto, the belt has the appearance of being merely wetted without appreciable egg color. The more nearly the egg approximates, for example, the thickness of a soap bubble film the better the results that are obtained. Inasmuch as the fatty substance in the egg becomes rancid and insoluble at 55° F., to obtain the best results the egg upon the belt should be maintained at a temperature not above 55° F., or if for a portion of the run of the belt such temperature be exceeded, this portion of the belt should be reduced to a minimum. Therefore, I apply egg to the belt preferably at a temperature as near the freezing point as possible, and by applying it in an exceedingly thin film I secure such a rapid evaporation of the moisture in the egg by a current of heated air that the solids in the egg remain cool and at a proper temperature. By reason of my availing myself of the phenomenon of rapid evaporation with its resulting low temperature of the substance from which the moisture is absorbed, the egg film and the belt remain cool and below a temperature that can injure the product.

While in the practice of my invention, the egg film should be kept at such temperature throughout the entire run of the belt, if toward the termination of the run thereof the temperature of the belt tends to rise above the point indicated, such portion of the run of the belt should be reduced to a minimum and the egg film is then brought in contact with the egg surface, whereby its temperature is again lowered. In order to obtain the best results, 1 continue the evaporation throughout the run of the belt. In this manner, when any portion of the belt is returned to receive thereon a second film of egg the preceding film is dried. In accordance with my invention, I dry each film so that it is not of a viscid nature when returned to the egg receptacle. The result of this is that no thicker film is taken up by any previous film than by the belt itself, and in fact I find in practice that the tendency of each egg film is to take up a thinner film than that originally taken up by the belt. Preferably the belt is of zinc, though it may be made of any suitable material.

In order that the egg may be preserved from contamination, I herein maintain the egg upon the belt from contact with other portions of the mechanism. Between the drums 2 and 3, the upper run of the belt may be supported upon its under side by means of guide rolls or other devices 8 (see Fig. 1), which may if desired extend from edge to edge of the belt, inasmuch as they contact therewith upon the non-egg receiving surface. It is desirable to support the lower run of the belt between the drums 2 and 3. I accomplish this effectively by providing clear tracks extending longitudinally of the belt, in which tracks run the guide disks 9 (see Fig. 1), which disks may be laterally adjusted in any suitable manner. Any desired number of such disks may be provided, both laterally and longitudinally of the belt. Any suitable means may be provided to furnish the cleared tracks upon the belt. Herein for the purpose I employ a series of clearing devices 10 (see Fig. 6), each constructed as a lever pivotally mounted upon a portion 11 secured in any suitable manner to any desired part of the mechanism. The forward end of the device 10 is suitably formed to clear a portion of the drum. If desired, a set screw 12 may be provided suitably mounted upon the tray 6 to bear upon each clearing device, thereby to vary the pressure thereof against the belt.

It is desirable that the belt be so supported that it may run truly and evenly upon the drums 2 and 3 without lateral creep. Moreover the belt should be so supported that all slack therein may be taken out, which may vary from time to time in accordance with the temperature. When the egg is removed from the belt and preferably by a scraper, as will be described, strain is thereby applied to the belt, thus giving a tendency to unevenness in the running thereof. To provide against this and other contingencies, I have herein mounted the bearings 13 of the drum 2 upon a movable frame 14 preferably provided with grooved rollers 15 (see Fig. 4) received upon suitable tracks upon the frame-work 16, whereby the frame 14 may be moved toward and from the drum 3 as found desirable. In order that slack may be taken up automatically, I herein mount upon the frame-work 16 a plurality of bell crank levers 17, from one arm of each whereof are suspended weights 18, the other arm 19 of each being connected to the frame 15 in any desired manner and preferably so as to permit adjustment as by the provision of the threaded bolt 20.

Viewing Fig. 1, a suitable supply or charge of egg is contained in the receptacle 21, wherein it is maintained from exposure to the air and is at a temperature at or near the freezing point, being maintained thereat by proper insulating material in or upon the receptacle, which insulating material may be hair felt. From this receptacle, the egg is delivered by a flexible or other pipe or tubing 22 to the concaved or recessed portion of the upper surface of the egg tray 6. As most clearly represented in Fig. 6, the egg tray 6 receives egg-batter only upon the upper surface thereof, the batter being confined to the concaved portion of such upper surface. This is accomplished by properly limiting the supply through the pipe or tubing 22. The egg receiving portion of the tray 6 as indicated in Fig. 6, is preferably of such relatively short length in the direction of travel of the belt that the surface of the egg exposed to the air is reduced to a minimum and the length of exposure of any portion of dried film upon the belt to the egg in the tray is reduced to a minimum. I have found in practice that if a dried film be retained in the egg supply for more than a minimum exposure, it tends to soften and become dissolved, thus injuring the product. The time of exposure of the egg in the tray 6 to the air should be reduced to a minimum as egg rapidly deteriorates in the presence of air. Preferably the egg tray 6 is hollow to receive therein a cooling medium, such as brine. Herein the tray is shown as insulated at the bottom with felt 23. While the brine may be supplied in any suitable manner to the egg tray, I preferably provide a circulating system having therein a tank 24 (see Fig. 2) adapted to receive if desired the brine from an external source through a pipe 25. If desired, this brine may be conveyed to the egg tray 6, for which purpose it may be forced by a rotary or other pump 26 to an elevated tank 27 by means of a pipe 28, from which tank it may be conveyed to the egg tray 6, a pipe 29 (see Fig. 4) being provided to return the brine to the tank 27, such pipe having a portion thereof maintained at a sufficient elevation to maintain a desired level of brine in said tray 6.

While the brine supply in the tray 6 may be maintained at any desired temperature, preferably it is kept at about 32° F., the egg supply upon the surface thereof being thus maintained at this temperature, so that the dried egg film is suddenly further cooled or reduced in temperature upon its return to this point at the same time that it receives another film thereon.

Preferably only a shallow supply of egg is maintained upon the tray 6, this supply being preferably maintained at a fixed level. For that purpose I provide (Figs. 1 and 5) a float valve 30 of cork or other suitable material.

Preferably the valve is provided with an arm 31 extending rearwardly therefrom and suitably pivoted at 32 upon the frame work, said arm 31 being of suitable conducting material and adapted to contact with terminals 33 and 34 of an electric circuit, whereby in any desired manner a valve is controlled, being either opened to admit a further supply, or closed to cut off a supply of egg.

Any desired form of valve may be employed for the purpose. In Fig. 1 is indicated a valve stem 35 normally held by spring pressure in valve closing position, a magnet 36 forming a portion of the circuit including the terminals 33 and 34, being provided whereby upon the closing of the circuit the valve may be opened to permit a further supply of egg to the tray 6. Such opening of the valve occurs whenever contact is made by the float arm 31 with the contact 33.

Preferably the egg tray 6 is mounted so as to be vertically adjusted, that is, toward and from the drum 2 and belt 1. Herein for the purpose the tray is supported upon a frame 37 (see Fig. 4) having thereon shouldered supporting bars 38 whereon the tray 6 is adapted to rest. The frame 37 is raised by means of four threaded shafts 39 received in threaded portions of the frame 37, such shafts passing through bearings in a frame 40 that is suspended from the frame 15 by means of hangers 41, most clearly shown in Fig. 1. Each shaft 39 is provided at its lower end with a beveled gear 42 meshing with a similar beveled gear 43 upon shafts 44 and 45 (see Fig. 1), preferably connected by sprocket gearing 46 to turn in unison when power is applied to either of said shafts, as, for example, by a handle 47. In this manner the tray may be raised or lowered while maintaining the same truly level.

Any suitable means may be provided to prevent the escape of the egg supply from the tray 6 at either edge of the belt 1. Herein for the purpose I have employed dams 48 (see Figs. 4 and 6) preferably composed of highly flexible rubber tubing which rests upon the tray 6 at or near opposite edges of the belt beyond the confines of the egg film thereon, such dams conforming to the contour of the belt 1 upon the drum 2 and affording a minimum amount of friction to the movement of the belt by reason of its described nature. In this manner contact of the egg film with the edges of the belt or with the drum 2 is effectually prevented.
In order suitably and rapidly to dry the egg film upon the belt 1, I preferably employ a current of heated air passing in contact therewith. If desired, the air may be received from the exterior of the building wherein the apparatus is located. I consider it unnecessary herein to illustrate any means for introducing air from the exterior of the building or means for heating the air to a desired temperature and maintaining it thereat. Preferably, however, I employ thermostats to maintain the temperature of the air at a desired point.
While air may be heated to any suitable temperature to dry the egg film upon the belt 1, preferably I maintain it at a temperature ranging from 120° F. to 130° F. and most desirably at about 122° F. I am enabled to bring air at this temperature in contact with the egg film without injuring the latter by reason of the fact that the film is so thinly disposed upon the belt 1 that the moisture is quickly dried therefrom, the solids of the egg remaining at a relatively low temperature throughout the process. Thus the undesirable combination of moisture in the egg in the presence of heated air is not long maintained. Although the heated air while in contact with the egg film upon the belt is traversed in the direction of movement of the belt and is admitted directly to the upper run thereof, it may be admitted to the lower run of the belt in the first instance or to both runs simultaneously. I have found it preferable to feed the air in the direction of travel of the belt 1, because the highly heated air acts at once upon the egg film as received from the egg supply, the air gradually dropping in temperature from 120° F. to about 100° F. during its travel in contact with the film upon the belt. I have found that in this manner evaporation of the moisture in the egg film is so rapid that the belt and egg are actually cold to the touch when the process is being carried out under the best conditions. As previously stated, the film is dried and as described is in the proper condition to receive a second film upon the non-viscid surface thereof. By any suitable blower the air is forced through passage 49 (see Fig. 1) in the direction of the arrow to a casing 50, suitably supported upon the frame work of the apparatus. Such casing provides a passage wherein the egg belt 1 travels throughout its course excepting where in contact with the drum 2 and where the egg is removed from the belt, and provides a passage for the heated air which may be discharged at the end thereof through a passage 51 (see Fig. 1). The superposed egg films may be removed from the belt 1 in any suitable manner. I herein employ a scraper normally maintained out of contact with the belt 1 in order that the desired number of films may be superimposed thereon. Such a scraper is indicated at 52 (see Fig. 1), it being pivoted upon the frame and having a depending arm 53 with which may be suitably engaged a cord 54 having a spring section 55, whereby the scraper may be brought into proper engagement with the belt 1 to remove the superimposed films therefrom. Preferably a roller 56 is disposed transversely of the belt 1 in contact with the non-receiving egg surface thereon and to afford an abutment against which the scraper operates. The superimposed films scraped from the belt may be received in any suitable receptacle as indicated at 57 in Fig. 1.
The pulley 5 is rotated by a worm wheel 58 (see Fig. 3) driven by a worm 59 mounted in the frame work and meshing therewith, such worm being driven in any suitable manner as by a pulley 60 upon shaft 61.
In stating that the moisture is removed from each film before it is returned to receive another thereon, I do not mean that absolutely all the moisture is removed therefrom, but that it is so far removed that the film is no longer of a viscid nature and is perfectly dry to the touch. I find in practice that good results are obtained by leaving about or nearly 10% of moisture upon the egg film while upon the belt. This renders such film non-viscid. The superposed films as removed from the belt crumble or break into flake form, each flake being as previously described of a laminated nature, being composed of a plurality of superimposed films. Inasmuch as each film is of uniform thickness throughout, it is apparent that each flake is parallel sided or of uniform thickness. The indicated amount of moisture is preferably maintained in each egg film upon the belt 1 and especially in the outer layer thereof at each step in the process, because I desire the evaporation to continue until or approximately until each film is returned to receive a superimposed film. If the moisture were entirely taken from each film at a relatively considerable period before such film had returned to the egg tray, then the temperature of the egg film would rapidly rise in the presence of the heated air in the casing and the product would be rendered insoluble and otherwise objectionable.
After the product has been removed and has assumed the laminated flake form described, it is subjected to the final drying in any desired manner. Preferably the flakes are placed upon trays 62 (see Figs. 7 and 8) which may be superimposed upon trucks 63 in a chamber 64, the temperature whereof should preferably be about 100° F. more or less, whereby the moisture in the egg is reduced to about 3% to 6%. Each of said trays is separated from the adjacent trays by means of a proper air space. As the first truck is loaded with filled trays, it is rolled to the far or left hand end of the chamber 64, viewing Fig. 7, succeeding trays being positioned in successive order. Thus the first truck load of trays may be removed from the far or left hand end of the chamber as indicated. The trays 62 may be of any suitable material, but preferably have a bottom of wire mesh 65, whereby the flakes may be exposed to the air at both their upper and lower surfaces. Thus substantially all the moisture is removed from the flakes, which are then carried to a room, the temperature whereof is about 40° F., where they are barreled and then subjected to a temperature of 0° F., where they may be kept indefinitely. As indicated in Fig. 7 at 66, air of the proper temperature is blown in preferably at one end of the chamber and herein at the left hand end, viewing said figure, and after passing in contact with the egg and subjecting the same to the described further drying operation is removed at the opposite end, as indicated at 67. As previously stated, by rapidly drying each film before another is superimposed thereon, the resulting product is rendered thoroughly and uniformly soluble in water at a normal temperature.

Claim.

The process of desiccating egg batter consisting in maintaining a supply of egg batter at substantially the temperature of freezing water, rapidly applying a very thin film thereof to a traveling carrier by permitting small sections only of said carrier to contact successively with the said egg supply, causing said carrier quickly to enter a heated drying medium, through which it travels for an extended time while moving in a direction substantially horizontal to avoid running of the batter, repeating this operation as desired to superpose successive films on that previously dried and removing the superposed films.

In testimony whereof, I have signed my name to this specification, in the presence of two subscribing witnesses.

JOHN M. HUSSEY.

Witnesses:
JOSIAH MINOT FOWLER,
IRVING U. TOWNSEND.